US009307554B2

(12) United States Patent
Raphaeli et al.

(10) Patent No.: US 9,307,554 B2
(45) Date of Patent: Apr. 5, 2016

(54) ARRAY OF VERY LIGHT READERS FOR ACTIVE RFID AND LOCATION APPLICATIONS

(75) Inventors: Dani Raphaeli, Kfar Saba (IL); Gideon Kaplan, Kiryal Ono (IL); Abraham Menkes, Ramat Hasharon (IL); Guy Sella, Bitan Aharon (IL); Izhar Marinov, Herzliya (IL); Uzi Ram, Givat Ela (IL)

(73) Assignee: ZIH Corp., Lincolnshire, IL (US)

( * ) Notice: Subject to any disclaimer, the term of this patent is extended or adjusted under 35 U.S.C. 154(b) by 1543 days.

(21) Appl. No.: 12/523,734

(22) PCT Filed: Feb. 28, 2008

(86) PCT No.: PCT/IL2008/000256
§ 371 (c)(1),
(2), (4) Date: Mar. 11, 2010

(87) PCT Pub. No.: WO2008/104981
PCT Pub. Date: Sep. 4, 2008

(65) Prior Publication Data
US 2010/0164690 A1 Jul. 1, 2010

Related U.S. Application Data

(60) Provisional application No. 60/892,256, filed on Mar. 1, 2007.

(51) Int. Cl.
*H04Q 5/22* (2006.01)
*H04W 74/00* (2009.01)
(Continued)

(52) U.S. Cl.
CPC ........... *H04W 74/00* (2013.01); *G06K 7/10306* (2013.01); *G06K 7/10356* (2013.01); *G06K 2017/0045* (2013.01)

(58) Field of Classification Search
CPC .......... G06K 7/10019; G06K 7/10039; G06K 7/10049; G06K 7/10108; G06K 7/10475; G06K 7/10306; G06K 7/10356; H04W 74/00; H04W 24/04
USPC .............. 455/41.2, 41.1, 552.1, 553.1, 556.1, 455/557, 456.1; 340/10.1–10.6, 340/539.1–539.32, 572.1–572.8, 5.1
See application file for complete search history.

(56) References Cited

U.S. PATENT DOCUMENTS 6,040,774 A * 3/2000 Schepps ..................... 340/572.1
6,078,251 A * 6/2000 Landt et al. ................ 340/10.41
(Continued)

FOREIGN PATENT DOCUMENTS

WO WO-2005/043270 A2 5/2005
WO WO-2005/112315 A2 11/2005

OTHER PUBLICATIONS

International Search Report and Written Opinion for corresponding International Application No. PCT/IL2008/000256, mailed Jan. 21, 2009.
(Continued)

*Primary Examiner* — Steven Lim
*Assistant Examiner* — Mancil Littlejohn, Jr.

(57) ABSTRACT

The Very Light Readers of the present invention are based on an augmented Tag circuit with a preferred embodiment including at least one VLSI chip integrating a UWB front end, digital transceiver, and possibly an internal controller; a UWB Antenna; a power supply; a controller configured to implement the Media Access Control protocol of the system; a Communication Interface subsystem for connection to the system network and a clock source. Also described is a system capable of reducing collision occurrence in a network for communicating between multiple readers and a plurality of RF Tags. Tags are configured to receive interrogation signals and transmit response signals. Readers are configured to transmit interrogation signals, receive response signals, estimate the quantity of responses received to an interrogation, determine the round trip delay time of each response and estimates whether a collision between responses has occurred. If so, the Reader transmits an additional interrogation signal. The Reader also transmits an acknowledgment packet to responding Tags so responding Tag will not answer again to that broadcast session. Other Readers in the network also receive the acknowledge packet and do not try again to reach the responding Tags, thereby lowering congestion directed toward Tags from multiple Reader transmissions.

14 Claims, 4 Drawing Sheets

(51) Int. Cl.
  *G06K 7/10* (2006.01)
  *G06K 17/00* (2006.01)

(56) References Cited

U.S. PATENT DOCUMENTS

| | | | | |
|---|---|---|---|---|
| 6,934,540 | B2* | 8/2005 | Twitchell, Jr. | 455/422.1 |
| 7,346,120 | B2* | 3/2008 | McCorkle | 375/295 |
| 7,373,109 | B2* | 5/2008 | Pohja et al. | 455/41.2 |
| 7,511,604 | B2* | 3/2009 | Raphaeli et al. | 340/10.2 |
| 7,835,372 | B2* | 11/2010 | Wang et al. | 370/401 |
| 7,898,391 | B2* | 3/2011 | Maguire et al. | 340/10.2 |
| 8,169,319 | B2* | 5/2012 | Kaplan et al. | 340/572.1 |
| 2003/0222762 | A1* | 12/2003 | Beigl et al. | 340/5.92 |
| 2006/0165060 | A1* | 7/2006 | Dua | 370/352 |
| 2006/0181393 | A1* | 8/2006 | Raphaeli | 340/10.1 |
| 2006/0274745 | A1 | 12/2006 | Wang et al. | |
| 2006/0280181 | A1* | 12/2006 | Brailas et al. | 370/392 |
| 2007/0001813 | A1 | 1/2007 | Maguire et al. | |
| 2007/0040681 | A1 | 2/2007 | Jessup | |
| 2007/0164109 | A1* | 7/2007 | Ridings et al. | 235/451 |
| 2007/0200712 | A1* | 8/2007 | Arneson et al. | 340/572.8 |
| 2007/0207732 | A1 | 9/2007 | Rofougaran et al. | |
| 2008/0018455 | A1 | 1/2008 | Kulakowski | |
| 2008/0122690 | A1* | 5/2008 | Wan et al. | 342/357.06 |

OTHER PUBLICATIONS

U.S. Appl. No. 60/609,240, filed Sep. 14, 2004.

\* cited by examiner

ARRAY OF VERY LIGHT READERS FOR ACTIVE RFID AND LOCATION APPLICATIONS

RELATED APPLICATIONS

This patent application is a U.S. National Phase Application of PCT/IL2008/000256 filed on Feb. 28, 2008, and also claims the benefit under 119(e) of Provisional Patent Application No. 60/892,256 filed Mar. 01, 2007, the contents of which are incorporated herein by reference.

FIELD AND BACKGROUND OF THE INVENTION

The present invention relates to RFID systems and, in particular, it concerns a cost effective system that uses an array of Very Light Readers (VLR's) in which each VLR is based on an augmented RFID Tag circuit.

RF identification (RFID) systems are used to track objects, animals and/or people in a large range of applications. A general term for the application is Asset Management. RFID systems are radio communication systems that communicate between a radio transceiver, called a Reader, and a number of inexpensive devices called Tags. The Reader is also called "Interrogator" in the relevant literature.

An RFID system generally includes multiple Tags which are attached to objects (or assets) being monitored and one or more Readers which are used to communicate with the Tags. An encoder is optionally used to program the Tags with unique identification information.

In some of the RFID applications there is a need for real-time visibility and real time location tracking of assets or people inside a campus, building or a site like a hospital, construction site, factory or school. Prior art includes Readers installed in carefully designated places such that coverage is maintained over all the facility. The Readers are often capable of managing hundreds or even thousands of Tags. The prior art Readers are connected to a central server using wired or wireless data connections.

Location of Tags is performed in prior art systems using triangulation of the data from several Readers, or the use of received signal strength information (RSSI).

US Patent Application No. 2007/0207732, "RFID Reader architecture" to Rofougaran et al., discusses a low-cost Reader realized by providing a transmitter operable to generate an outbound radio frequency (RF) signal and a receiver operable to receive an inbound RF signal having a frequency similar to a frequency of the outbound RF signal on a single integrated circuit. Apparently, in this application, the Reader is a device which works with passive Tags; such Tags produce a back-scattering of the signal transmitted by the Reader.

US patent application 2007/0040681, "Low cost RFID system" to Jessup, also discusses a Reader (or "interrogator") for passive Tags, where the Reader and system design comprises a low cost RFID system which allows individual Tags to be isolated, selected, programmed and verified.

US patent application no. 2007/0001813, "Multi-Reader coordination in an RFID system", to Maguire et al. discusses a situation where multiple Readers cover a given volume. If multiple Readers broadcast at the same time, so-called "Reader collision" may occur. Reader collisions occur when the signals from two or more Readers overlap in time within the same or a proximate frequency band. The greater the number of Readers, the more likely Reader collision is to occur. Maguire et al. discloses a method of operating a plurality of Radio Frequency Identification Readers includes operating the Readers according to a spatial-division and time-division synchronization schedule.

US patent application no. 2008/0018455, "RFID modular Reader" to Kulakowski, discusses an RFID Reader for reading out and, optionally, recording information in non-contact RFID cards, using portable devises as the central unit, characterized by a modular structure, having a casing for the portable unit that contains a replaceable Reader module, connected thereto, along with the antennae. The characteristic feature of the Kulakowski is that the modularity enables it to interconnect with different mobile devices existing on the market, which lowers the price of the device and simplifies its software and usage.

Generally speaking, the prior art Readers are capable devices, but their price and size often require limiting the number deployed in a system in order to maintain a reasonable overall system cost, which in turn lowers the coverage abilities of the system. The requirement of serving large number of Tags in a large volume thereby requiring coverage of large distances may increase the cost of the Reader further. If the volume to be covered is divided into a number of sub-volumes such as a large facility with a number of small rooms, by non-limiting example, then the use of Readers usually capable of providing coverage for the size of the facility may still not provide adequate RF coverage due to RF attenuation caused by walls and ceilings.

There is therefore a need for a cost effective system that uses an array of Very Light Readers (VLR's) in which each VLR is based on an augmented RFID Tag circuit.

SUMMARY OF THE INVENTION

The present invention is a cost effective system that uses an array of Very Light Readers (VLR's) in which each VLR is based on an augmented RFID Tag circuit.

According to the teachings of the present invention there is provided, a low cost RFID Very Light Reader device comprising: (a) a wide-band Active RFID Tag; (b) a controller configured to implement the Media Access Control (MAC) protocol of the system; and (c) a communication interface subsystem that provides connection to a system network.

According to a further teaching of the present invention, the wide-band Active RFID Tag includes: (a) at least one VLSI chip integrating a UWB front end and high speed digital transceiver; (b) a UWB Antenna; (c) a power supply; and (d) a clock source.

According to a further teaching of the present invention, the system network includes communication via any one communication protocol or media, or a combination any from a list that includes: Wifi, Wimax, UWB, power lines, Bluetooth®, Ethernet.

There is also provided according to the teachings of the present invention, a modular wide-band RFID Very Light Reader device comprising: a) at least one Tag module having at least one VLSI chip integrating a UWB front end and high speed digital transceiver; and b) a base module configured for interconnection with a plurality of said Tags modules, said base module having at least: i) a controller configured to implement the Media Access Control (MAC) protocol of the system; and ii) a communication interface subsystem that provides connection to a system network.

According to a further teaching of the present invention, said base module is configured for interconnection with more than one Tag module so as to increase reception capabilities of the modular wide-band RFID Very Light Reader.

According to a further teaching of the present invention, said Tag module also includes: i) a UWB antenna; ii) a power supply; and iii) a clock source.

According to a further teaching of the present invention, said base module also includes: i) a UWB Antenna, such that all Tags interconnected to said base module share said UWB antenna; ii) a power supply; and iii) a clock source.

There is also provided according to the teachings of the present invention, a method used by a UWB active RFID system, to determine which tags are located near a reader, the method comprising, limiting a reader to receive replies from tags during predetermined time intervals so as to limit reception to replies whose combined reader transmission and tag reply time-of-flight falls within a predetermined length of time, such that replies are received only from tags that are located within a predetermined distance of the reader.

There is also provided according to the teachings of the present invention, a method for implementing an Active RFID system that employs communication between Readers in order to improve the Backhaul reliability by utilizing reader reception overlap, the method comprising: upon transmission of a packet from a first reader and subsequent reply to the packet from a tag, the reply is received by a second reader, the second reader relays the reply to a system server and informs the first reader of receipt of the reply, whereupon the first reader sends an acknowledgement to the tag.

There is also provided according to the teachings of the present invention, a method of reducing the collision occurrence in a network for communicating between multiple readers and a plurality of RF tags, the method comprising the steps of: (a) transmission by at least one Reader of at least one wide band interrogation signal; (b) reception of the interrogation signal by at least one Tag; (c) transmission by the Tag of a response signal in response the interrogation signal; (d) reception of the response signal by the Reader; (e) estimation by the Reader as to a quantity of wide band response signals received in response to the interrogation signal; (f) determination by the Reader of a round trip delay time of each the response signal; (g) estimation by the Reader as to whether a collision between a plurality of the wide band response signals occurred and if so, (i) transmission by the Reader of at least one additional wide band interrogation signal, the additional wide band interrogation signal initiating a new communications session between the Reader and the at least one RF Tag in order to reduce the collision probability between the wide band response signals transmitted by the Tags; and (h) transmission by the Reader of an acknowledgment packet to the responding Tag such that, (i) the Tag will not answer again to that broadcast session in case a broadcast command has to be re-transmitted due to an estimation that some collisions occurred during a previous session; and (ii) at least one other such Reader in the network receives the acknowledge packet such that the other Reader will not try again to reach the Tag, thereby lowering congestion directed toward the Tag from multiple Reader transmissions.

There is also provided according to the teachings of the present invention, a system capable of reducing the collision occurrence in a network for communicating between multiple readers and a plurality of RF tags, the system comprising: (a) at least one Tag configured to receive at least one wide band interrogation signal, transmit a response signal in response the interrogation signal; (b) at least one Reader configured to transmit the interrogation signal and receive the response signal, the Reader further configured to: (i) estimate a quantity of wide band response signals received in response to the interrogation signal; (ii) determine a round trip delay time of each the response signal; (iii) estimate as to whether a collision between a plurality of the wide band response signals occurred and if so, transmit at least one additional wide band interrogation signal, the additional wide band interrogation signal initiating a new communications session between the Reader and the at least one RF Tag in order to reduce the collision probability between the wide band response signals transmitted by the Tags, and (iv) transmit an acknowledgment packet to the responding Tag such that, the responding Tag will not answer again to that broadcast session if a broadcast command is re-transmitted due to an estimation that some collisions occurred during a previous session, and (c) at least a second Reader in the network configured to receive the acknowledge packet such that the second Reader will not try again to reach the Tag, thereby lowering congestion directed toward the Tag from multiple Reader transmissions.

There is also provided according to the teachings of the present invention, a method by which a central network controller dynamically determines overlapping coverage between a plurality of Readers in the network, the method comprising: analyzing at least one response of at least one Tag to at least one broadcast message from a first Reader wherein the response is received by more than one receiving Reader in the plurality of Readers and each the receiving Reader relays the response to the central network controller such that the central network controller determines an extent of coverage overlap between at least some Readers in the plurality of Readers in the network.

According to a further teaching of the present invention, the analyzing includes analyzing a plurality of responses from a plurality of Tags.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a cost effective system that uses an array of Very Light Readers (VLR's) in which each VLR is based on an augmented RFID Tag circuit.

The principles and operation of system that uses an array of VLR's according to the present invention may be better understood with reference to the drawings and the accompanying description.

By way of introduction, the terms "Very Light Reader", "Very Light Readers", "VLR" (singular) and "VLR's" (plural) are used herein to refer to an augmented RFID Tag circuit as described herein and such terms may be used interchangeably.

The VLR's of the present invention provide an alternative to the costly RF Readers of the prior art. The system of the present invention uses a relatively large quantity of VLR's per a given site, providing higher coverage and with a low installation and maintenance cost. In order to reduce the size and cost in comparison to known Readers, the functionality of a VLR is limited.

The VLR's of the present invention are based on an augmented Tag circuit. That is, a Tag circuit operationally connected to additional components. The VLR's may be installed, for example, one in every room of the facility to be covered.

Due to the limited functionality of the VLR's, several methods are suggested in the context of the present invention that improve overall network utilization. Embodiments of the present invention include cooperation between the VLR's that assist in increasing the effective throughput in the Tag to Reader communication, such as, but not limited to, algorithms to improve congestion control of a multiplicity of Readers/VLR's and a method to distribute the load between Readers/VLR's.

Connection of VLR'S to the network can be done using various methods and devices currently known in the art. The VLR'S coordination requirements, as the result of the algorithms and methods described herein, are low such that no very reliable links, nor low latency, are required.

An exemplary, non-limiting list of convenient low cost backbone connections includes wireless (e.g. Wifi, Wimax, Cellular, or UWB by non-limiting example), cable, fiber optic, or connection over power lines. It is to be understood that in order to function even with a non reliable link back to the central server the VLR's need to exhibit "smart" autonomous behavior as will be described herein.

Figure 1:
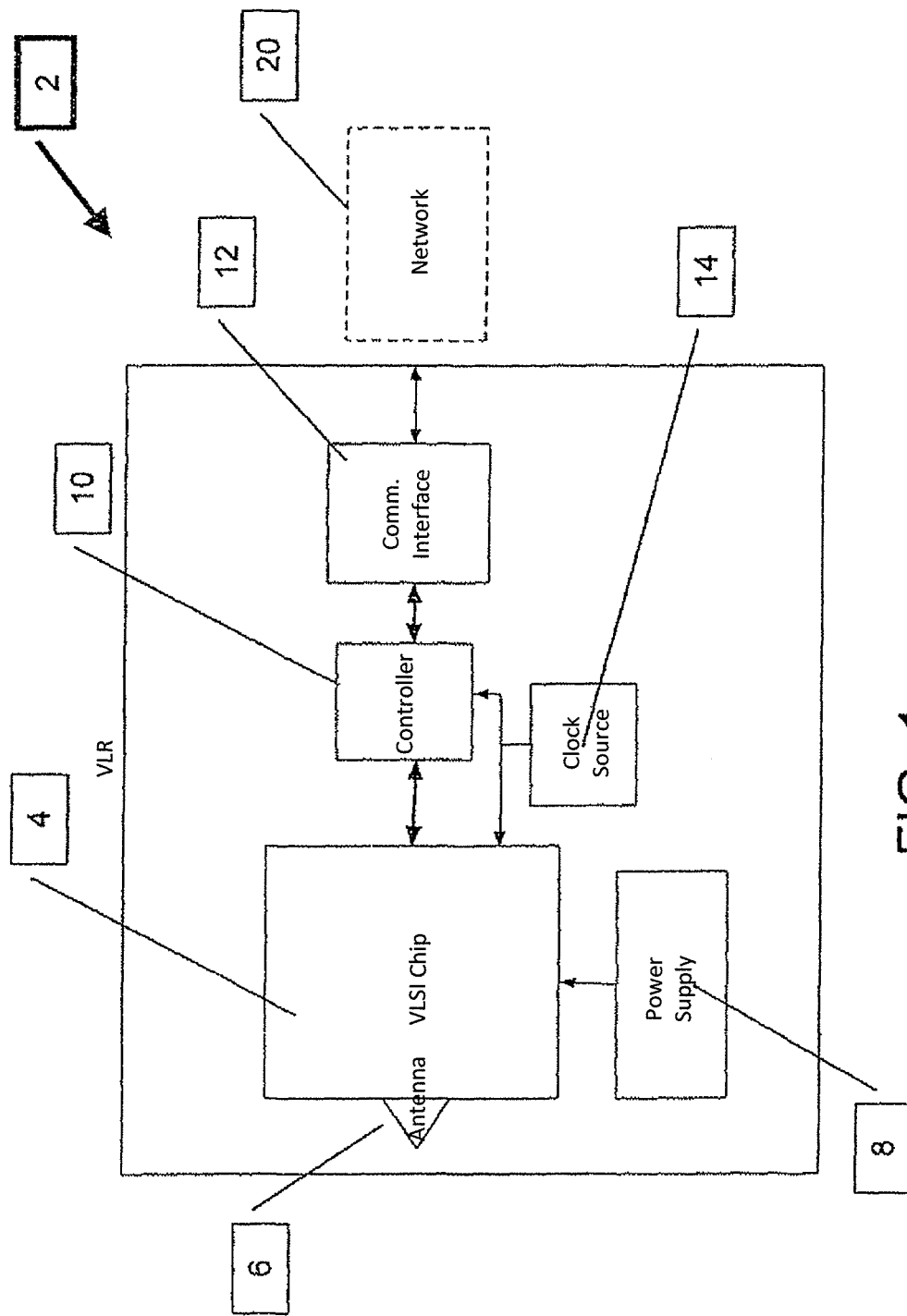
FIG. 1 is a schematic block illustration of a preferred embodiment of a VLR constructed and operational according to the teachings of the present invention.

A Very Light Reader of the present invention uses UWB for communication between VLR's and Tags, and other ways of communication for back-haul communication. A preferred embodiment of a VLR device 2 of the present invention is composed of the following components illustrated in FIG. 1.

At least one VLSI chip 4 integrating the UWB front end, high speed digital transceiver, and possibly an internal controller (CPU).

A UWB Antenna 6.

A power supply, preferably a battery 8.

A controller 10 configured to implement the Media Access Control (MAC) protocol of the system, possibly assisted by the VLSI chip controller.

A Communication Interface subsystem 12 that provides connection to the system network 20. Such a subsystem 12 can use, by non-limiting example, Wifi, Wimax, UWB, power lines, Bluetooth®, Ethernet, or any other communication protocol or media.

A clock source 14.

It will be appreciated that generally an Active RFID Tag can process only one packet at a time, if each transmission takes typically 10 msec, a VLR based on such a Tag may probably handle around 20-40 packets (to/from Tags) per second. A Tag as described in the patent application PCT/IL2005/000506 "Fast Synchronization of RF Tags" to two of the present inventors, can receive multiple packets at the same time, and therefore could be used to benefit as the "front end" of a VLR of the present invention, and would enable handling of several tens of Tag messages per second.

It will also be appreciated that by removing the controller 10 and the Communication Interface 12 the remaining portion of a VLR can be configured to operated as a RFID Tag (which may be attached to an object), using a low cost battery 8, possibly using a lower cost clock source 14, and typically operating the device in an alternating "active" and "sleep" modes.

The power supply of the VLR 2 must be capable of operating the device always in an active state for the specified life time of the VLR 2 and provide power to the VLSI chip 4 enabling the CPU software to create control channels whereby the Master controller 10 uses the CPU as a slave to send and receive UWB packets. In other words, the CPU implements the layer 2 connection, and the controller 10 performs the network control, routing and congestion control. Note that such a configuration requires that the CPU in the VLSI chip 4 has some means for communicating messages to the controller 10, preferably with a simple communication protocol. This feature is not available in prior art Tags.

Figure 2:
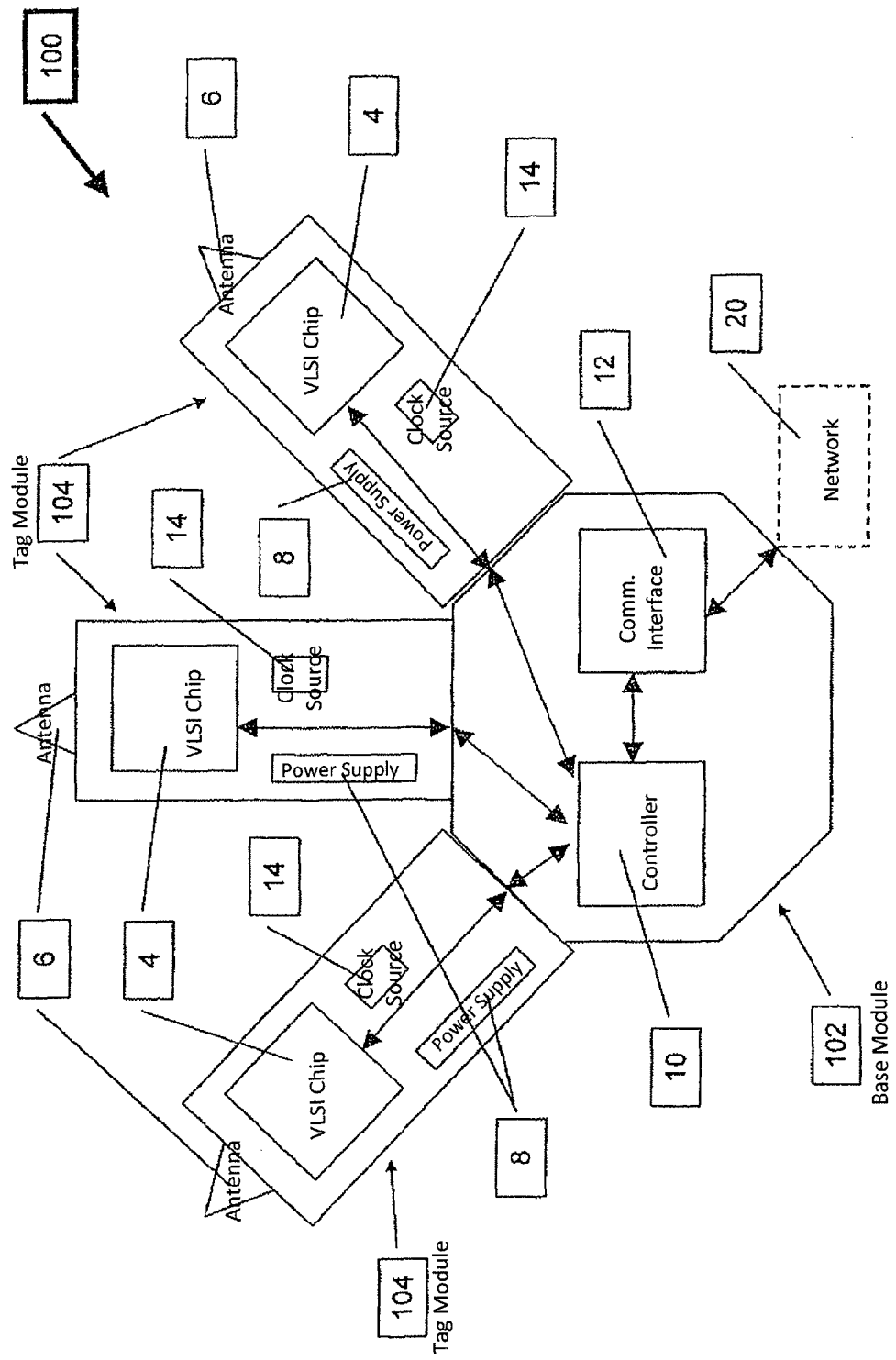
FIG. 2 is a schematic block illustration of a first preferred embodiment of a modular VLR constructed and operational according to the teachings of the present invention.
Figure 3:
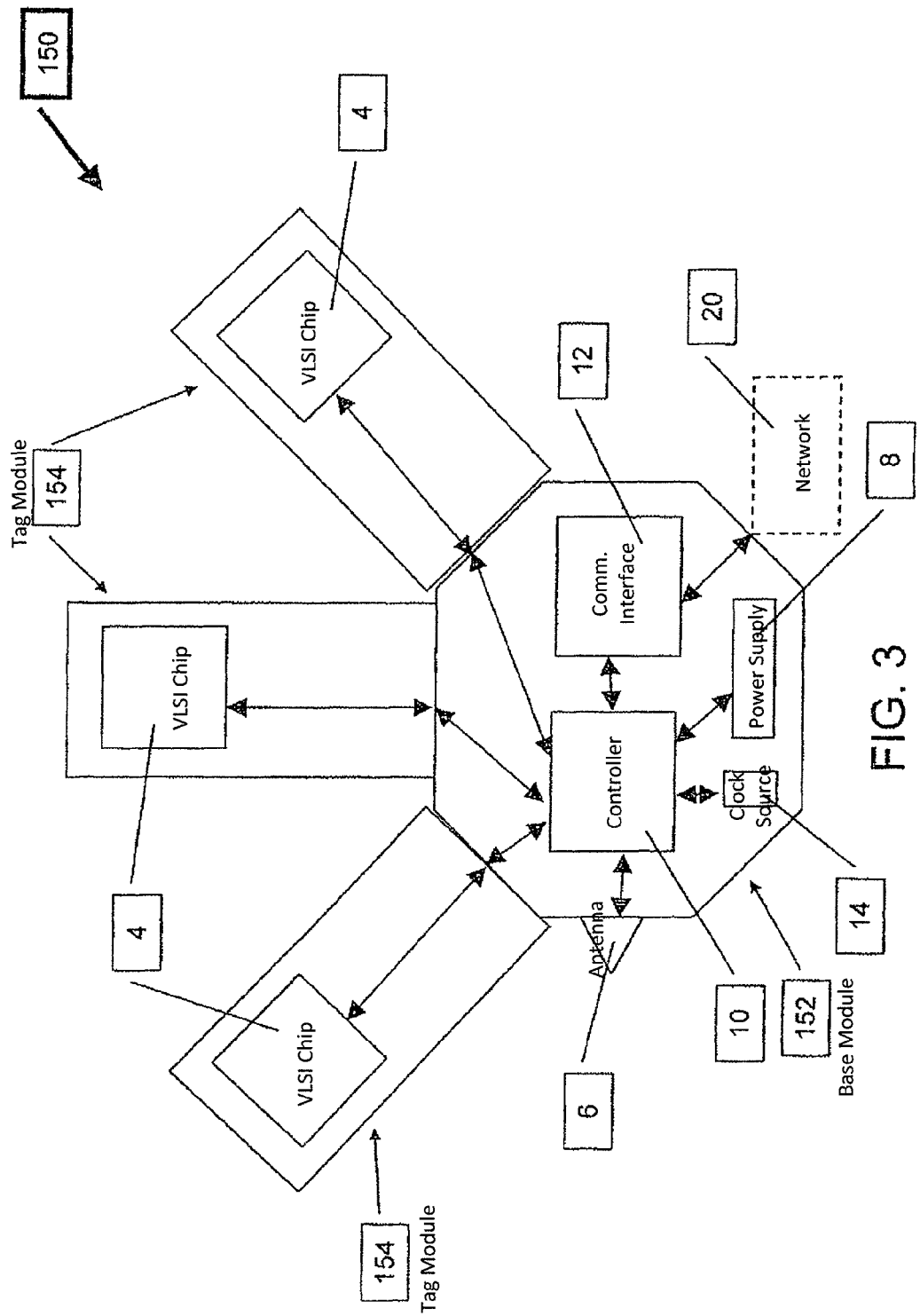
FIG. 3 is a schematic block illustration of a second preferred embodiment of a modular VLR constructed and operational according to the teachings of the present invention.

As illustrated in FIGS. 2 and 3, the VLR of the present invention may be configured as a modular device having a base module and a plurality of Tag modules, in which the various operational components are deployed in one or the other of the base module and the Tag module. It will be understood that the addition of Tag modules increases the reception capacity of the modular VLR to which the Tags are added.

A first preferred embodiment of a modular VLR 100, as illustrated in FIG. 2, is configured with a base module 102 that includes the controller 10 and the Communication Interface 12. The VLSI chip 4, UWB antenna 6, clock 14 and battery 8 are deployed in a Tag module 104 that may be interconnected to the base module 102 so as to be used as part of the VLR 100. It will be understood as discussed above, the Tag Module 104 may also be used as a standalone Tag. The base module 102, although illustrated here with three Tag modules 104 attached, may be configured to accept substantially any number of Tag modules depending on size and other hardware requirements of any particular end-use application.

A second preferred embodiment of a modular VLR 150, as illustrated in FIG. 3, is configured with a base module 152 that includes the controller 10, the Communication Interface 12, UWB antenna 6, clock 14 and battery 8. The VLSI chip 4 is deployed in the Tag module 154 that may be interconnected to the base module 152 so as to be used as part of the VLR 150. In this embodiment, all of the Tags are powered by battery 8 and share the use of UWB antenna 6. Here too, although base module 152 is illustrated with three Tag modules 154 attached, base module 152 may be configured to accept substantially any number of Tag modules depending on size and other hardware requirements of any particular end-use application.

Figure 4:
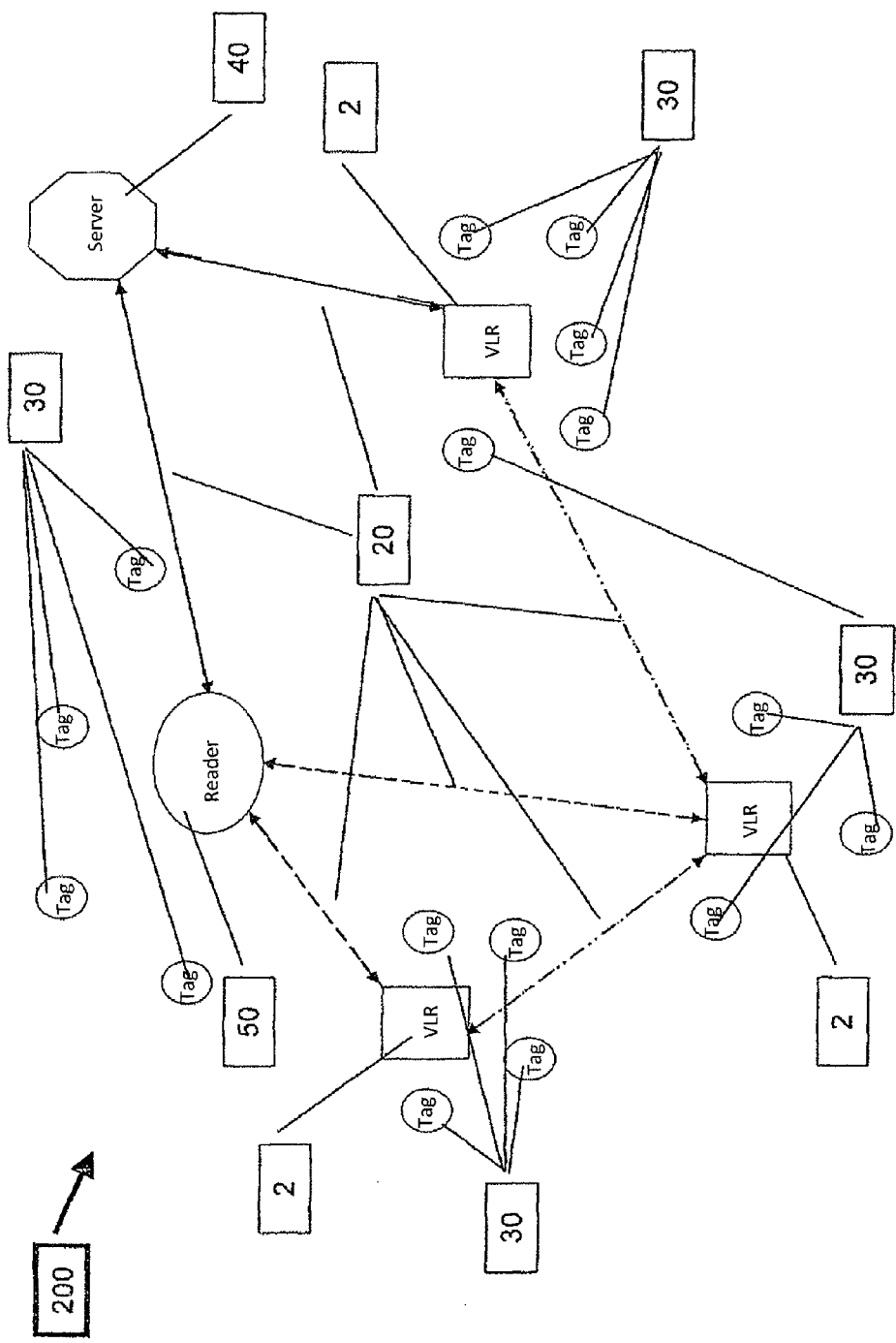
FIG. 4 is a schematic block illustration of an exemplary embodiment of a system network including Tags, VLR's, Readers, a Server and communication infrastructure constructed and operational according to the teachings of the present invention.

A preferred embodiment of an overall system 200, as illustrated in FIG. 4, can be described as a layer 3 network, in which the central server 40 and the Readers 50 and VLR's 2 are connected using layer 2 connections such as, but not limited to power line, Ethernet and wireless connection. The VLR's 2 and the Tags 30 communicate in another layer 2 connection (wireless) with the VLR's 2 provide the routing.

It is also possible to use the standard IP protocol for communicating with the VLR's or even with the Tags. If in order to save the cost of a processor and memory and decrease the overhead over the air, the Tags used do not implement the IP protocol, the VLR's provide the protocol conversion for back-end communication, thereby providing seamless use of IP in the RFID network. The server of the system can include a table which presents an updated status of the network such as, but not limited to, noting which Tags are in the proximity of each VLR. Such a map is very useful for performing an Asset Management application.

It is noted, that for some systems it is advantageous to use the UWB Reader to Reader communications backbone instead or in conjunction with the other means of communications. In this way the coverage is improved, and system cost is reduced. In cases where there is low bandwidth use of the system, such a backbone is advantageous. In this mode of operation the VLR's form a mesh network. When is a server present to collect information or command the network, the server communicates with one or more of the Readers/VLR's using conventional means these Readers/VLR's relay the information using the UWB mesh network formed using the Reader/VLR to Reader/VLR UWB communications together with routing capabilities configured in the relay Readers/VLR's.

One of the tasks commonly performed in RFID systems is determining which Tags are located in the vicinity of a specific Reader/VLR. For example, the Reader/VLR may be located near a gate and it is desired to know which Tags pass through the gate. Generally, the Reader/VLR transmits broadcast signals in its vicinity and the Tags receiving the broadcast signal respond to the broadcast signal. However, it is necessary to prevent the occurrence of collisions between the response signals of different Tags. Various methods have been suggested for preventing collisions, or in general terms, performing congestion control.

One method for determining which Tags are located near the VLR is to take advantage of the implementation of the UWB link. As described in U.S. Provisional Patent Application 60/609,240 (to some of the present authors), UWB communications can employ interleaved impulse radio to allow multiple transmissions simultaneously. For example, a very short transmission pulse sequence of 100 nsec is employed for a single symbol transmission, while employing, as a non-limiting example, a relatively low symbol rate of 50 Ksps (time between symbols of 20 μsec). This allows up to 200 simultaneous transmissions.

In normal operation the Readers or Tags will randomly choose any of the abovementioned 200 possible transmission "phases", while the receivers will "listen" or wait for answers in all of them as well. However, if Tags reply to a Reader transmission in a phase which is very close to the phase in which it was received, the reply will reach Reader in a phase influenced by the physical location of the Tags in relation to the Reader. The farther the Tag is from the Reader, the longer the time difference between the Reader's transmission and reception of the Tag's reply. Therefore, by limiting its reception to specific phases, the Reader can limit its receptions to Tags that are located within a predetermined distance range from the Reader. This provides a method, based on the combined time-of-flight for a transmission and reply, for determining which Tags are in the vicinity of the Reader, while ignoring replies from Tags that are outside of the predetermined range yet still answered that Reader's transition. That is to say, limiting a reader to receive replies from tags during predetermined time intervals so as to limit reception to replies whose combined reader transmission and tag reply time-of-flight falls within a predetermined length of time, such that replies are received only from tags that are located within a predetermined distance of the reader.

This is also advantageous for reducing the number of reply receptions for a Reader whose reception capacity is limited, such as the limited reception capabilities of the VLR's of the present invention as discussed below.

Considering the cost of providing high throughput per a single prior art Reader, one of the underlying principles of the present invention is that VLR's have a relatively low throughput. Unlike a standard Reader that can handle hundreds or even thousands of Tag messages per second, in a preferred embodiment, the VLR's are equipped to handle up to several tens of Tags per second. This limitation may pose a congestion problem in a network encompassing all the Tagged devices.

In order to resolve the congestion issue, an embodiment of the present invention includes a system with a multitude of unsynchronized VLR's which have a distributed congestion resolving mechanism or payload sharing mechanism.

For our discussion herein, we will concentrate on RFID systems that employ Ultra Wide Band (UWB) transmissions both for information transfer between Tags and Readers, as well as for locating a Tag. Furthermore, we assume that the system uses some kind of a "multiple access", where a number of Tags can simultaneously reply to a Reader's query.

Each VLR uses its ability to transmit and receive UWB signals to measure the time of flight and thus its distance from a Tag, as known in the prior art of UWB Readers. This information from all VLR's in the system is sufficient to enable the system to determine, with a high reliability, the closest VLR to each Tag. Once this is established, further queries to Tags can use this information and lower response times. Prior art low-cost Readers, which do not make use of UWB techniques, mainly use the signal strength (sometimes donated RSSI in the literature) to know which Reader is the closest to any given Tag. In other prior art systems, instead of Readers there are just beacon transmitters and the Tag has the responsibility to measure the signals from various beacons and decide its own location. These systems are at a disadvantage since the Tag needs to be "smart." However, this method can be used to advantage in the system of the present invention, equipped with VLR's, in that the Tags do not need to be "smart."

It is to be noted that prior art congestion control mechanisms apply to one Reader transmitting at the time, and do not apply correctly to the problem of multiple Readers transmitting concurrently.

The multi Reader network as described herein, where each VLR actually has a low inherent multi-access capability, calls for innovative way for congestion control.

In addition to the VLR's, it is assumed that a wide-band Tag can process one or more packets at a time but not more than N packets simultaneously.

Thus, according to the present invention, there is provided a method and a corresponding system for communicating between multiple Very Light Readers and a plurality of RF Tags, the method including the steps of:

1. Readers/VLR's transmit wide band interrogation signals (either unicast or multicast).
2. Tags wait to receive the wide band interrogation signals.
3. Tags receive the wide band interrogation signals which are possibly overlapping and if possible (according to whether the number of concurrent packet is not exceeded) transmit in response a wide band response signal.
4. A Reader/VLR receives the wide band response signal which may include other overlapping wide band response signals from the Tags, and
   (a) the Reader/VLR attempts to distinguish between the multiple wide band response signals from the Tags, and when distinguishable, detects the wide band response signals, transmitted by the Tags,
   (b) the Reader/VLR estimates the number of wide band response signals to the wide band interrogation signal,
   (c) the Reader/VLR analyzes the distinguishable wide band response signals in order to determine their round trip delay.
5. Each Reader/VLR estimates whether a collision between a plurality of the wide band response signals occurred and when the Reader/VLR estimates that the collision occurred, the Reader/VLR transmits at least one additional wide band interrogation signal. This additional wide band interrogation signal initiates a new communications session between the Reader/VLR and the RF Tags in order to reduce the collision probability between the wide band response signals transmitted by the Tags.

6. Each Reader/VLR that received a valid Tag response from a responding Tag transmits an acknowledgment packet toward the responding Tag in order that,
   (a) the responding Tag will not answer again to that broadcast session in case the broadcast command has to be issued again (due to the estimation that some collisions occurred during the previous session),
   (b) each Reader/VLR that receives the acknowledge packet that was transmitted from another Reader/VLR to a specific Tag and having the same session ID will know that the Tag already received the command and the Reader/VLR will not try again to reach that Tag, thus lowering congestion directed toward the Tags from multiple Reader/VLR transmissions. This Reader/VLR may still send his own packet to that Tag in order to measure the distance of that Tag from it.

Each transmission request of a Reader/VLR, which can be a new command pending, an acknowledgment, or retransmission of a previous command, is conditioned on the network situation at the time. A Reader/VLR should not transmit when the Tags in its proximity are already occupied with other transmissions, nor should the Reader/VLR transmit when other Readers/VLR's are receiving many responses from Tags. It is a purpose of the present invention to describe a novel method for avoiding overcrowding the Tags and the Readers/VLR's. This is a modification of the well-known ALOHA protocol.

Each Tag in its response packet will include a field specifying the number of active receivers. Reader/VLR A sends a packet and listens to the Tag responses. If a Tag does not respond, it may be either because that Tag did not hear that packet, or because that Tag is occupied with other packets from other Readers/VLR's. Reader/VLR A listens to the Tag responses to other Readers/VLR's transmissions and determines if the field specifying the number of occupied receivers indicates that the number of occupied receivers has reached a predetermined limit or other threshold. If the threshold has been reached, Reader/VLR A enters into a backoff state. It is advantageous to use an exponential backoff like in a standard ALOHA protocol.

A Reader/VLR is in addition listening to all traffic of other Readers/VLR's. When a Readers/VLR's determines that its receivers were occupied above a threshold number of packets the Reader/VLR should enter a backoff state. In order to further protect the Readers/VLR's from overloading due to the requests of other Readers/VLR's, there is the same parameter of number of occupied receivers, also attached to any packet that a Reader/VLR is sending, so other Readers/VLR's can backoff their requests or transmitted packets. It is advantageous also in this case, to use an exponential backoff.

In some preferred implementation of the system of the present invention, a Tag does not enter into backoff state when answering a Reader/VLR. This simplifies the operation of a Reader/VLR. In other embodiments the Tags refrain from answering a Reader/VLR if other the packets from Readers/VLR's contain a full occupancy in their special field of number of occupied receivers.

Another method for reducing the congestion is by making sure that Readers/VLR's with overlapping coverage do not transmit at the same time. Overlapping of Readers/VLR's converge may be intentional when, for location purposes, each Tag is seen by multiple Readers/VLR's, and also in cases where accurate location is not required, due to installation and logistics requirements.

Even in the case where only one Reader/VLR is transmitting, the fact that there is overlap in coverage can be used to increase the throughput of the system. In such a case, each Reader transmission includes some Reader specific information such as, but not limited to, a Reader ID. When a Reader/VLR receives a reply to a broadcast transmission, it will forward this reply to the server, even if this reply is to a transmission that was not originated from that specific Reader/VLR. The Reader/VLR also sends a message to the originating Reader/VLR indicating that it has received a reply from a Tag. The originating receiver will then send an acknowledgement to the Tag, indicating that its reply was received. This in effect creates a distributed Reader/VLR, which has multiple receivers. This way of "coordinated networking" increases the effective capacity of the VLR's.

Moreover, the fact that a reply from a specific Tag, was received by Reader/VLR B, despite the fact that the Tag was replying to a transmission from Reader/VLR A, allows the network controller (server) to determine that Readers/VLR's A and B have overlapping coverage. That is to say, by analyzing which Readers/VLR's in the network forward each particular Tag response to the central network controller, the central network controller is able to determine an extent of coverage overlap between at least some of the Readers in the network. This information is useful to manage the network and determine which Readers/VLR's can transmit simultaneously.

It will be appreciated that the above descriptions are intended only to serve as examples and that many other embodiments are possible within the spirit and the scope of the present invention.

What is claimed is:

1. A method of reducing collision occurrence in a network for communicating between multiple readers and a plurality of radio frequency (RF) tags, the method comprising:
   transmitting by at least one reader of at least one wide band interrogation signal;
   receiving a response signal from a tag in response the interrogation signal;
   estimating, by the reader, a quantity of wide band response signals received in response to the interrogation signal;
   determining, by the reader, a round trip delay time of each of the wide band response signals;
   estimating, by the reader, whether a collision occurred between a plurality of the wide band response signals;
   when the collision is estimated to have occurred, transmitting, by the reader, at least one additional wide band interrogation signal, the additional wide band interrogation signal initiating a new communications session between the reader and the tag to reduce a collision probability between wide band response signals transmitted by the plurality of RF tags; and
   transmitting, by the reader, an acknowledgment packet to the tag such that;
      the tag will not answer again to that broadcast session in case a broadcast command has to be re-transmitted due to an estimation that some collisions occurred during a previous session; and
      at least one other reader in the network receives the acknowledgement packet such that the other reader will not try again to reach the tag, thereby lowering congestion directed toward the tag from multiple reader transmissions.

2. The method of claim 1 wherein:
upon transmission of a packet from the reader and subsequent reply to the packet from a tag, the reply is received by a second reader, the second reader relays the reply to a system server and informs the reader of receipt of the reply, whereupon the reader sends a second acknowledgement to the tag.

3. The method of claim 1, further comprising limiting the reader to receive replies from tags during predetermined time intervals so as to limit reception to replies whose combined reader transmission and tag reply time-of-flight falls within a predetermined length of time, such that replies are received only from tags that are located within a predetermined distance of the reader.

4. A system capable of reducing collision occurrence in a network for communicating between multiple readers and a plurality of radio frequency (RF) tags, the system comprising:
a first one of the tags configured to receive at least one wide band interrogation signal and transmit a response signal in response the interrogation signal;
a first one of the readers configured to transmit the interrogation signal and receive the response signal, the first one of the readers further configured to:
estimate a quantity of wide band response signals received in response to the interrogation signal;
determine a round trip delay time of each of the wide band response signals;
estimate whether a collision between a plurality of the wide band response signals occurred and if so, transmit at least one additional wide band interrogation signal, the additional wide band interrogation signal initiating a new communications session between the first one of the readers and the first one of the tags to reduce a collision probability between the wide band response signals transmitted by the tags; and
transmit an acknowledgment packet to the first one of the tags such that, the first one of the tags will not answer again to that broadcast session if a broadcast command is re-transmitted due to an estimation that some collisions occurred during a previous session; and
at least a second reader in the network configured to receive the acknowledgement packet such that the second reader will not try again to reach the first one of the tags, thereby lowering congestion directed toward the at least one tag from multiple reader transmissions.

5. A system as defined in claim 4, further comprising a central network controller to dynamically determine overlapping coverage between the multiple readers in the network by analyzing at least one response of at least one of the tags to at least one broadcast message from the first one of the readers wherein the at least one response is received by more than one receiving reader in the multiple readers and each said receiving reader relays the response to the central network controller such that the central network controller determines an extent of coverage overlap between at least some readers in the multiple readers in the network.

6. The system of claim 4, wherein the first one of the readers comprises:
a wide-band active RFID tag configured to transmit and receive in a wide-band radio frequency;
a controller configured to implement a Media Access Control (MAC) protocol; and
a communication interface subsystem configured to be operated with the controller, wherein the communication interface subsystem provides connection to a system network through a channel separate from the wide-band active RFID tag.

7. The system of claim 4, wherein the first one of the readers comprises;
(a) at least one tag module having at least one Very-Large-Scale Integration (VLSI) chip integrating an ultra wide band (UWB) front end and digital transceiver; and
(b) a base module configured for interconnection with a plurality of the at least one tag module, the base module having at least:
(i) a controller configured to implement a Media Access Control (MAC) protocol; and
(ii) a communication interface subsystem configured to be operated with the controller, wherein the communication interface subsystem that provides connection to a system network through a channel separate from a wide-band active RFID tag of the first one of the readers.

8. The system of claim 6, wherein the wide-band active RFID tag includes:
at least one Very-Large-Scale Integration (VLSI) chip integrating an ultra wide band (UWB) front end with a digital transceiver;
a UWB antenna;
a power supply; and
a clock source.

9. The system of claim 6, wherein the communication interface subsystem providing connection to the system network includes communication via one or more of Wifi, Wimax, UWB, power lines, Bluetooth®, or Ethernet.

10. The system of claim 7, wherein the base module is configured for interconnection with more than one tag module to increase reception capabilities of the modular wideband RFID.

11. The system of claim 7, wherein the tag module includes:
(i) a UWB antenna;
(ii) a power supply; and
(iii) a clock source.

12. The system of claim 7, wherein the base module includes:
(iii) a UWB antenna, such that all tags interconnected to the base module share the UWB antenna;
(iv) a power supply; and
(v) a clock source.

13. The system of claim 5, wherein the analyzing includes analyzing a plurality of responses from the plurality of tags.

14. A reader to reduce collision occurrence in a network for communicating between multiple readers and a radio frequency tags, the reader comprising:
communication hardware to:
transmit a wide band interrogation signal; and
receive response signals from one or more of the tags, the response signals being responsive to the wide band interrogation signal; and
a processor to:
estimate a quantity of the wide band response signals received in response to the interrogation signal;
determine a round trip delay time of each of the wide band response signals;
estimate whether a collision occurred between the response signals;
when the collision is estimated to have occurred, provide at least one additional wide band interrogation signal to be transmitted by the communication hardware, the additional wide band interrogation signal configured to initiate a new communications session between the reader and the one or more of the tags to reduce a collision probability between response signals transmitted by the tags; and provide an acknowledgment packet to the one or more of the tags such that:
- the one or more of the tags will not answer again to that broadcast session in case a broadcast command has to be re-transmitted due to an estimation that some collisions occurred during a previous session; and
- at least one other reader in the network receives the acknowledgement packet such that the other reader will not try again to reach the one or more of the tags, thereby lowering congestion directed toward the one or more of the tags from multiple reader transmissions.

* * * * *